(12) United States Patent
Heyl

(10) Patent No.: US 10,589,594 B2
(45) Date of Patent: Mar. 17, 2020

(54) HEAT DISTRIBUTION IN A MOTOR VEHICLE

(71) Applicant: Hanon Systems, Daejeon (KR)

(72) Inventor: Peter Heyl, Cologne (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/361,139

(22) Filed: Nov. 25, 2016

(65) Prior Publication Data

US 2017/0182864 A1    Jun. 29, 2017

Related U.S. Application Data

(62) Division of application No. 13/945,594, filed on Jul. 18, 2013, now abandoned.

(30) Foreign Application Priority Data

Jul. 18, 2012  (DE) .................. 10 2012 106 497
Jun. 4, 2013   (DE) .................. 10 2013 105 747

(51) Int. Cl.
*B60H 1/00*    (2006.01)
*F25B 40/00*   (2006.01)
(Continued)

(52) U.S. Cl.
CPC ..... *B60H 1/00385* (2013.01); *B60H 1/00271* (2013.01); *B60H 1/00907* (2013.01);
(Continued)

(58) Field of Classification Search
CPC ........... B60H 1/00385; B60H 1/00271; B60H 1/323; B60H 2001/00307; B60K 6/22;
(Continued)

(56) References Cited

U.S. PATENT DOCUMENTS 3,888,084 A * 6/1975 Hawkins ............... F01K 23/065
                                                    60/614
5,680,764 A * 10/1997 Viteri .................... F01K 21/047
                                                    60/39.6
(Continued)

FOREIGN PATENT DOCUMENTS

CN    1701209 A    11/2005
CN    102029873 A  4/2011
(Continued)

*Primary Examiner* — Ljiljana V. Ciric
(74) *Attorney, Agent, or Firm* — Shumaker, Loop & Kendrick, LLP; James D. Miller

(57) ABSTRACT

A device for heat distribution in a hybrid motor vehicle includes an engine cooling circuit and a refrigerant circuit for a combined operation in a refrigeration heat pump mode and a reheating mode. The refrigerant circuit includes an evaporator, a compressor, a heat exchanger to supply heat from the refrigerant to air being conditioned for a passenger compartment, and a heat exchanger to transfer heat between a refrigerant of the refrigerant circuit and coolant of the engine cooling circuit. The heat exchanger operates as an evaporator for the heat transfer from the coolant to the evaporating refrigerant, and alternatively operates as a condenser for the heat transfer from the condensing refrigerant to the coolant.

3 Claims, 4 Drawing Sheets

(51) Int. Cl.
| | |
|---|---|
| *F25B 6/04* | (2006.01) |
| *F25B 49/02* | (2006.01) |
| *B60L 1/00* | (2006.01) |
| *B60L 3/00* | (2019.01) |
| *B60L 50/16* | (2019.01) |
| *F25B 13/00* | (2006.01) |
| *B60H 1/32* | (2006.01) |
| *B60K 6/22* | (2007.10) |
| *B60K 11/02* | (2006.01) |
| *F25B 9/00* | (2006.01) |

(52) U.S. Cl.
CPC ............... *B60H 1/323* (2013.01); *B60K 6/22* (2013.01); *B60K 11/02* (2013.01); *B60L 1/003* (2013.01); *B60L 3/0023* (2013.01); *B60L 3/0061* (2013.01); *B60L 50/16* (2019.02); *F25B 6/04* (2013.01); *F25B 13/00* (2013.01); *F25B 40/00* (2013.01); *F25B 49/02* (2013.01); *B60H 2001/00307* (2013.01); *B60H 2001/00928* (2013.01); *B60H 2001/00935* (2013.01); *B60H 2001/00949* (2013.01); *B60L 2240/34* (2013.01); *B60L 2240/36* (2013.01); *B60L 2240/425* (2013.01); *B60L 2270/46* (2013.01); *B60Y 2200/91* (2013.01); *B60Y 2200/92* (2013.01); *B60Y 2306/05* (2013.01); *F25B 9/008* (2013.01); *F25B 2341/0662* (2013.01); *F25B 2400/0409* (2013.01); *F25B 2400/0417* (2013.01); *F25B 2400/0419* (2013.01); *F25B 2600/2501* (2013.01); *Y02T 10/642* (2013.01); *Y02T 10/70* (2013.01); *Y02T 10/7077* (2013.01); *Y10S 903/904* (2013.01)

(58) Field of Classification Search
CPC . B60K 11/02; B60Y 2200/92; B60Y 2200/91; B60Y 2306/05; Y10S 903/904
USPC .................................................. 62/238.1, 239
See application file for complete search history.

(56) References Cited

U.S. PATENT DOCUMENTS

| | | | | |
|---|---|---|---|---|
| 5,878,589 | A * | 3/1999 | Tanaka | B60H 1/00007 165/80.2 |
| 6,032,869 | A * | 3/2000 | Ito | B60H 1/00314 165/103 |
| 6,047,770 | A * | 4/2000 | Suzuki | B60H 1/00007 165/202 |
| 6,070,650 | A * | 6/2000 | Inoue | B60H 1/00428 165/202 |
| 6,332,497 | B1 * | 12/2001 | Niwa | B60H 1/00007 165/204 |
| 6,351,957 | B2 | 3/2002 | Hara | |
| 6,394,210 | B2 * | 5/2002 | Matsuda | B60H 1/00278 180/65.1 |
| 6,607,142 | B1 | 8/2003 | Boggs et al. | |
| 7,629,530 | B2 | 12/2009 | Inaoka | |
| 2001/0020529 | A1 | 9/2001 | Karl | |
| 2001/0052238 | A1 * | 12/2001 | Burk | B60H 1/00921 62/323.1 |
| 2002/0084769 | A1 * | 7/2002 | Iritani | B60H 1/3208 320/104 |
| 2002/0185546 | A1 * | 12/2002 | Homan | B60H 1/00735 237/2 A |
| 2003/0127528 | A1 | 7/2003 | Sabhapathy et al. | |
| 2004/0069012 | A1 * | 4/2004 | Inoue | B60H 1/02 62/500 |
| 2004/0168454 | A1 * | 9/2004 | Iritani | B60H 1/004 62/230 |
| 2005/0067158 | A1 * | 3/2005 | Ito | B60H 1/00007 165/204 |
| 2005/0178523 | A1 | 8/2005 | Itoh et al. | |
| 2005/0224221 | A1 | 10/2005 | Feuerecker et al. | |
| 2005/0247336 | A1 | 11/2005 | Inaoka | |
| 2006/0026981 | A1 | 2/2006 | Inaba et al. | |
| 2006/0080985 | A1 | 4/2006 | Inaba et al. | |
| 2006/0107681 | A1 | 5/2006 | Uno et al. | |
| 2007/0181356 | A1 | 8/2007 | Ando et al. | |
| 2007/0289326 | A1 | 12/2007 | Nishikawa et al. | |
| 2008/0251235 | A1 * | 10/2008 | Zhou | B60H 1/00278 165/41 |
| 2009/0013705 | A1 * | 1/2009 | Nishikawa | B60H 1/00 62/239 |
| 2009/0031749 | A1 * | 2/2009 | Nishikawa | B60H 1/00921 62/324.3 |
| 2009/0249807 | A1 * | 10/2009 | Nemesh | B60H 1/00278 62/117 |
| 2009/0260386 | A1 | 10/2009 | Wittmann et al. | |
| 2009/0314462 | A1 | 12/2009 | Yayia et al. | |
| 2010/0012295 | A1 * | 1/2010 | Nemesh | B60H 1/00278 165/104.19 |
| 2010/0326127 | A1 * | 12/2010 | Oomura | B60H 1/00785 62/498 |
| 2011/0072841 | A1 | 3/2011 | Arai et al. | |
| 2011/0174000 | A1 * | 7/2011 | Richter | B60H 1/00064 62/93 |
| 2011/0296855 | A1 * | 12/2011 | Johnston | B60L 3/0046 62/79 |
| 2012/0085114 | A1 | 4/2012 | Graaf et al. | |
| 2012/0253573 | A1 | 10/2012 | Shigyo | |
| 2012/0279243 | A1 * | 11/2012 | Endo | B60H 1/00921 62/238.6 |
| 2012/0304674 | A1 * | 12/2012 | Schwarzkopf | B60H 1/00385 62/79 |
| 2014/0020415 | A1 * | 1/2014 | Heyl | F25B 13/00 62/119 |
| 2014/0374081 | A1 * | 12/2014 | Kakehashi | B60K 11/02 165/202 |
| 2016/0082805 | A1 * | 3/2016 | Graaf | B60H 1/00899 165/202 |
| 2016/0153343 | A1 * | 6/2016 | Kakehashi | B60H 1/00885 123/41.31 |
| 2017/0080778 | A1 * | 3/2017 | Suzuki | B60H 1/00921 |
| 2017/0106725 | A1 * | 4/2017 | Kim | B60H 1/00428 |
| 2017/0158081 | A1 * | 6/2017 | Kim | B60L 58/27 |
| 2017/0174038 | A1 * | 6/2017 | Scheldel | B60H 1/00278 |
| 2018/0097266 | A1 * | 4/2018 | Jalilevand | B60L 1/02 |

FOREIGN PATENT DOCUMENTS

| | | |
|---|---|---|
| DE | 19833251 A1 | 1/1999 |
| DE | 602004006248 T2 | 12/2007 |
| DE | 102009056085 A1 | 6/2011 |
| DE | 102009060860 A1 | 7/2011 |
| DE | 102010000990 A1 | 7/2011 |
| DE | 102011100198 A1 | 11/2011 |
| DE | 102010038406 A1 | 1/2012 |
| EP | 1613903 A1 | 1/2006 |
| EP | 1613903 B1 | 5/2007 |
| EP | 2305494 A1 | 4/2011 |
| FR | 2967759 A1 | 5/2012 |
| JP | H11134640 A | 2/1999 |
| JP | 2006523813 A | 10/2006 |
| JP | 3952545 B2 | 8/2007 |
| JP | 2008308080 | 12/2008 |
| JP | 4321587 B2 | 8/2009 |
| JP | 2011073536 A | 4/2011 |
| JP | 2011237052 A | 11/2011 |
| WO | 2004092662 A1 | 10/2004 |
| WO | 2011079904 A1 | 7/2011 |
| WO | 2012069334 A1 | 5/2012 |
| WO | 2012120603 A1 | 9/2012 |

* cited by examiner

HEAT DISTRIBUTION IN A MOTOR VEHICLE

CROSS-REFERENCE TO RELATED APPLICATION

This U.S. patent application is a divisional application of U.S. patent application Ser. No. 13/945,594 filed Jul. 18, 2013, which claims the benefit of German Provisional Patent Application No. 10 2012 106 497.0 filed Jul. 18, 2012 and German Non-Provisional Patent Application No. 10 2013 105 747.0 filed Jun. 4, 2013, the entire disclosures of the applications being considered part of the disclosure of this application, and hereby incorporated by reference.

BACKGROUND

Motor vehicles with different drive systems, include propulsion by means of an internal combustion engine, an electric motor, or a combination of the two motor types. In motor vehicles with a combination of internal combustion engine and electric motor drive system, one distinguishes between motor vehicles with a pure hybrid drive, also known as "Plug-in hybrid electric vehicle" (PHEV), and "Range Extenders".

PHEV vehicles can have electric, electric/combustion, and also combustion engine propulsion. The range of the vehicle with pure electric drive is around 50 km. Vehicles with "Range Extenders" are driven constantly by electric propulsion. The battery of the vehicle is charged during travel by a generator driven by the combustion engine.

A PHEV and a vehicle with "Range Extender" are motor vehicles whose battery can be charged additionally by an external power network or charging system.

The air conditioning of the passenger compartment of electric vehicles, makes use of either electric resistance heaters (PTC) or heat pump systems, since the waste heat of the electric motor is not enough to heat the passenger compartment. PTC heating systems are economical in manufacture, but due to the consumption of electrical energy they reduce the operating range of the electric vehicle. The use of heat pump systems is more cost-intensive, but the impact on the operating range of the electric vehicle is less.

In motor vehicles with a combination drive unit of combustion engine and electric motor, the use of a PTC heating system or heat pump system likewise reduces the range of the electric motor, but the travel can continue due to the operation of the combustion engine. Furthermore, the operation of the combustion engine provides heat for the heating of the passenger compartment to a higher temperature level. Moreover, the heat provided by modern internal combustion engines is not enough to heat the passenger compartment adequately. An important aspect of motor vehicles with "Range Extender" is that the combustion engine is operated at the optimal point and the available heating power is low.

Due to the heating by a PTC heating system or a fuel-operated supplemental heater, the passenger compartment can be comfortably heated and preconditioned. Still, the use of these systems in motor vehicles with electric motor drive or with hybrid drive is questionable for ecological reasons.

Air conditioning systems of motor vehicles with heating function may have a refrigerant circuit with a supplemental heat exchanger operating as an evaporator. The supplemental heat exchanger is usually configured as a connection to a coolant circuit, serving to control the temperature of components of the drive unit in motor vehicles with electric motor drive. In motor vehicles with internal combustion engine, the supplemental evaporator is used to provide an option for heat transfer between the cooling circuit of the combustion engine and the refrigerant circuit.

For example, a system for a motor vehicle for the heating and/or cooling of a passenger compartment and for cooling an internal combustion engine is found in DE 10 2010 038 406 A1. The system comprises a coolant circuit for cooling an internal combustion engine with an ambient air heat exchanger to surrender heat from the coolant to the ambient air and a refrigerant circuit with a condenser, a compressor, and a first evaporator, exposed to a flow of air from the passenger compartment, for cooling the passenger compartment in the cooling mode. In the heat pump mode, the air being taken to the passenger compartment can be heated by the refrigerant circuit, taking up heat from the ambient air. The refrigerant circuit in this case has a second evaporator and condenser, which are configured as coolant heat exchangers. The refrigerant circuit is thus thermally coupled to the coolant circuit.

In DE 10 2009 060 860 A1 an air conditioning system is described for an electric or hybrid vehicle with a refrigerant circuit and a temperature control circuit for controlling the temperature of the passenger compartment and a vehicle component. The circuits are thermally coupled via a heat exchanger for taking up heat from the temperature control circuit and a heat exchanger for surrendering heat to the temperature control circuit. When controlling the temperature of vehicle components, heat from the temperature control circuit is transferred to the refrigerant circuit at the low pressure side and heat from the refrigerant circuit is transferred to the temperature control circuit at the high pressure side of the refrigerant circuit.

With the help of the two supplemental heat exchangers in the refrigerant circuit as thermal couplings to the temperature control circuit, consumption devices such as the periphery of the electric motor, especially the battery, fuel cells, power electronics and/or the passenger compartment are conditioned and climate-controlled in this way. Thanks to a separation of the temperature control circuit into two independent circuits, the internal combustion engine can also be cooled, besides the mentioned components. The heat given off by the combustion engine is transferred to the surroundings or used to heat the air going to the passenger compartment.

Furthermore, the power from the operation of photovoltaic cells or solar panels can also be incorporated in the corresponding circuits, for example.

SUMMARY

The aspects disclosed herein include a device for heat distribution in a motor vehicle, especially in a hybrid vehicle, with an engine cooling circuit and a refrigerant circuit configured for a combined operation in the refrigeration system mode and the heat pump mode and for a reheating mode. The refrigerant circuit has an evaporator, a compressor, a heat exchanger for heat supply from the refrigerant to the air being conditioned for a passenger compartment and a heat exchanger for transfer of heat between the refrigerant of the refrigerant circuit and the coolant of the engine cooling circuit. A method for operating is also provided.

Operating a device for heat distribution in a motor vehicle, for example in a hybrid vehicle, having an engine cooling circuit and a refrigerant circuit configured for a combined operation in refrigeration system and heat pump mode and for a reheating mode, with an evaporator, a compressor, a heat exchanger for heat supply from the refrigerant to the air being conditioned for a passenger compartment and a heat exchanger for transfer of heat between the refrigerant of the refrigerant circuit and the coolant of the engine cooling circuit, the refrigerant/coolant heat exchanger is operated by design as a condenser for the heat transfer from the condensing refrigerant to the coolant when operating in the refrigeration system mode or in the reheating mode and as an evaporator for the heat transfer from the coolant to the refrigerant being evaporated in the heat pump mode.

DESCRIPTION OF THE DRAWINGS

Further details, features and benefits of the invention will emerge from the following description of sample embodiments with reference to the corresponding drawings.

DETAILED DESCRIPTION

Figure 1A:
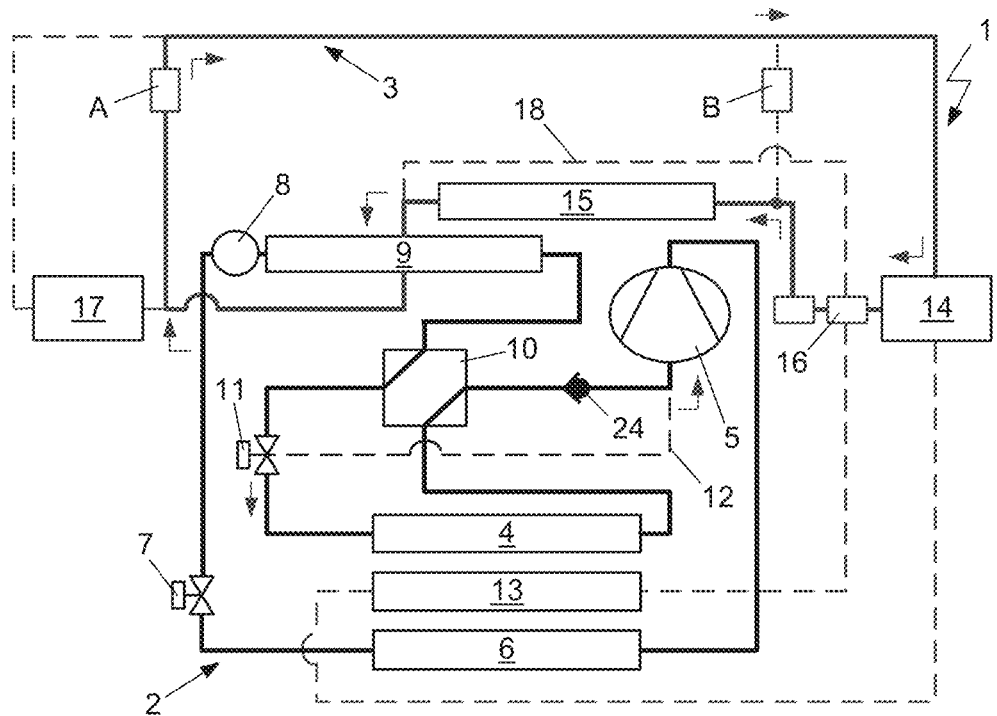
FIGS. 1a to 1e: a combined engine cooling circuit for air conditioning a combustion engine and an electric motor.

None of the above described techniques utilize both the internal combustion engine and the electric motor in a joint system as heat sink and/or heat source, as needed, or integrates the motor in a thermal management unit within the air conditioning system of the passenger compartment.

The aspects disclosed herein are directed to a device for the heat distribution of a motor vehicle outfitted with a combined combustion engine and electric motor drive, including the thermal management of the motors and an air conditioning unit for the heating and cooling of the air going to the passenger compartment. It should be possible to operate the motor vehicle efficiently, cost-effectively, and ecologically friendly in terms of the electricity consumption, fuel consumption, emission of pollutants and motor operation by making use of several heat sources. Furthermore, the number of components of the drive should be as few as possible, especially with regard to the number of heat exchangers.

The aspects disclosed herein are direct to a device for heat distribution in a motor vehicle, for example in a hybrid vehicle, having an engine cooling circuit and a refrigerant circuit configured for a combined operation in refrigeration system and heat pump mode and for a reheating mode. The refrigerant circuit has an evaporator, a compressor, a heat exchanger for heat supply from the refrigerant to the air being conditioned for a passenger compartment and a heat exchanger for transfer of heat between the refrigerant of the refrigerant circuit and the coolant of the engine cooling circuit.

The heat exchanger for heat transfer between the refrigerant and the coolant, hereinafter also called the refrigerant/coolant heat exchanger, is arranged in the device and configured to operate as an evaporator for the heat transfer from the coolant to the refrigerant being evaporated and as a condenser for the heat transfer from the condensing refrigerant to the coolant. Depending on the operating mode, the heat exchanger can be operated as an evaporator or a condenser. The direction of flow of the refrigerant may remain unchanged in this process.

The refrigerant/coolant heat exchanger is configured either as a plate type heat exchanger or as a tube bundle heat exchanger.

Inside the engine cooling circuit, a first motor and a second motor are arranged. The first motor is configured as an internal combustion engine and the second motor as an electric motor. Furthermore, additional motors can advantageously be incorporated into the motor cooling circuit.

According to the aspects disclosed herein, a device for heat distribution in a motor vehicle is provided, for example in a hybrid vehicle, having an engine cooling circuit and a refrigerant circuit with an evaporator, a compressor, a heat exchanger for heat supply from the refrigerant to the air being conditioned for a passenger compartment and a heat exchanger for transfer of heat between the refrigerant of the refrigerant circuit and the coolant of the engine cooling circuit.

According to the concept, the engine cooling circuit has a first motor and a second motor, the first motor being configured as an internal combustion engine and the second motor as an electric motor.

The refrigerant circuit is configured for a combined operation in the refrigeration system in a heat pump mode and a reheating mode. The heat exchanger for the heat transfer between the refrigerant and the coolant to be arranged and configured so as to operate as an evaporator for the heat transfer from the coolant to the refrigerant being evaporated and as a condenser for the heat transfer from the condensing refrigerant to the coolant.

Furthermore, additional motors can be incorporated in the engine cooling circuit.

Coolant can flow through the motors regardless of their operating condition. Consequently, the motors can be exposed to the coolant both in the operating condition and in the non-operating condition, so that an air conditioning of the motors may occur at any time.

According to one example, the first motor and the second motor are integrated in the engine cooling circuit and the engine cooling circuit is configured such that a mass flow of coolant may be conducted through the first motor for heat transfer and through the second motor for heat transfer. Consequently, the motors may be coupled via a common mass flow of coolant through the engine cooling circuit, that is, the individual mass flow of coolant can flow through both motors in succession in the flow direction and thus the motors are exposed to the flow one after the other in series.

As the coolant flows through them, the motors can be conditioned as needed, with heat being transferred between the particular motor and the coolant. Heat can be taken away from or supplied to the motor, so that the motor is to be understood as a heat source or a heat sink. The conditioning occurs independently of the configuration of the motors, either by direct heat transfer between coolant and motor or through intermediate agents.

According to another example, the engine cooling circuit comprises the heat exchanger for heat transfer between the refrigerant of the refrigerant circuit and the coolant of the engine cooling circuit, a heat exchanger for surrendering heat from the coolant to the air going to the passenger compartment, and a heat exchanger for heat transfer between the coolant and the ambient air.

A bypass may be arranged around the heat exchanger for heat transfer between the coolant and the ambient air, so that the coolant can be conducted around the heat exchanger as needed.

According to another example, the engine cooling circuit is subdivided into a high-temperature cooling circuit for air conditioning of the first motor and a low-temperature cooling circuit for air conditioning of the second motor. The refrigerant/coolant heat exchanger is arranged so that it can operate alternately in the high-temperature coolant circuit and in the low-temperature coolant circuit on the engine cooling circuit side.

This divided configuration of the engine cooling circuit enables a separate conditioning of the motors, and thus, the adjusting of optimal temperatures in the partial circuits of the combustion engine and the electric motor.

High-temperature cooling circuit and low-temperature cooling circuit are coupled together via change-over valves. The change-over valves are arranged in the flow direction of the coolant upstream and downstream from the refrigerant/coolant heat exchanger.

According to another example, the high-temperature cooling circuit includes the heat exchanger for heat transfer between the refrigerant of the refrigerant circuit and the coolant of the high-temperature cooling circuit, a heat exchanger for surrendering heat from the coolant to the air going to the passenger compartment, and a heat exchanger for heat transfer between the coolant and the ambient air.

The low-temperature cooling circuit has a heat exchanger for heat transfer between the refrigerant of the refrigerant circuit and the coolant of the low-temperature cooling circuit, and a heat exchanger for heat transfer between the coolant and the ambient air.

Thus, the flow direction of the coolant in the engine cooling circuit can be reversed, so that flow can move bidirectionally through the components of the engine cooling circuit.

According to another example, depending on the operating mode of the refrigerant circuit, the motors exposed to the flow of coolant of the engine cooling circuit and the ambient air are used as heat sources and/or heat sinks as necessary. The motors can also be used as thermal masses in which heat can be stored or stored heat can be carried away, depending on the operating condition of the motor.

The combined system of the device for heat distribution in a motor vehicle, especially for the cooling and/or warming up of combustion engine and electric motor as needed, enables a preconditioning of both motors before being placed in operation. For this purpose, the motors are integrated in the thermal management of the motor vehicle provided with a combined combustion engine and electric motor drive and its air conditioning system for heating and cooling of the air going to the passenger compartment.

The motors which can be used as stores of heat/cold in special driving conditions are brought into the cooling of the passenger compartment, for example, after maximum possible heating in the electric motor operation ("pulldown"). In this process, heat is given off to the surroundings and to the combustion engine, which advantageously decreases the high pressure in the refrigerant circuit. Furthermore, the heat exchanger for the heat transfer between the coolant and the ambient air can be configured to use less installation space.

According to another example, when the refrigerant circuit is operating in the refrigeration system mode and the second motor is operating at the same time, the coolant of the engine cooling circuit heated upon flowing through the refrigerant/coolant heat exchanger operating as a condenser and through the second motor serving as a heat source flows through the first motor and heat is transferred to the first motor. Thus, the first motor is already warmed up when it is placed in operation, which leads to lower emission of pollutants, and is utilized as an additional heat sink of the engine cooling circuit.

Further benefits of the device for heat distribution are as follows:
- the heating system for a PHEV or a motor vehicle with "Range Extender" can be operated efficiently, environmentally friendly, and economically within an overall concept of thermal management of the motor vehicle,
- utilizing of a plurality of heat sources (motors, exhaust, charging air, battery, electronics, passenger compartment, and air from the surroundings), the heat of the heat sources being conducted through the coolant circuit,
- heat storage inside the motors as thermal masses and utilization of the residual heat of the combustion engine when operating in heat pump mode, if the electric motor is in operation,
- preconditioning of the passenger compartment and of the cold motor (especially the combustion engine), not in the driving condition, to the optimal operating temperature, with additional cooling of the coolant circuit,
- flow through both motors at the same time is possible, which simplifies the switching of the engine cooling circuit, and
- utilization of the internal combustion engine as a heat sink in the in event of a pulldown and start by the electric motor.

DETAILED DESCRIPTION

In FIGS. 1a to 1e the device 1 for a motor vehicle with the refrigerant circuit 2 and the combined engine cooling circuit 3 for conditioning a first motor 14 configured as an internal combustion engine and a second motor 17 configured as an electric motor is shown in different operating modes. The lines of the refrigerant circuit 2 or the engine cooling circuit 3 that are in operation are illustrated by solid lines, while lines not in operation are shown by means of broken lines. The flow directions of the fluids are shown via arrows.

The refrigerant circuit 2 comprises, besides the evaporator 4, compressor 5, heat exchanger 6 operated as a heating register, also known as a second condenser or heat pump condenser, valve 7, receiver 8, and heat exchanger 9 operated as a condenser, arranged in succession in the flow direction of the refrigerant in the refrigeration system mode or reheating mode, which is shown in FIG. 1a, also an inner heat exchanger 10. An inner heat exchanger 10 refers to a heat exchanger internal to the circuit, which serves for the transfer of heat between the refrigerant at high pressure and the refrigerant at low pressure. For example, on the one hand the liquid refrigerant is further cooled down after condensation in the heat exchanger 9 and on the other hand the intake gas upstream from the compressor 5 is superheated. The check valve 24 allows passage in the indicated direction of flow of the refrigerant.

The supercooled refrigerant upon emerging from the inner heat exchanger 10 at the high pressure side is expanded upon flowing through the valve 11, operated as an expansion element, and evaporated in the evaporator 4 upon taking up heat from the air going to the passenger compartment. In this way, the air is cooled down and/or dehumidified.

If the refrigerant becomes liquid during subcritical operation, such as with the refrigerant R134a or during certain environmental conditions with carbon dioxide, the heat exchanger 9 is called a condenser. Some of the heat transfer takes place at constant temperature. In supercritical operation or at supercritical surrender of heat in the heat exchanger 9, the temperature of the refrigerant decreases constantly. In this case, the heat exchanger 9 is also called a gas cooler. Supercritical operation can occur under certain environmental conditions or operating modes of the refrigerant circuit 2, for example, with carbon dioxide as refrigerant.

The heat transferred to the refrigerant in the evaporator 4 from the air being taken to the passenger compartment is either returned proportionately in the heat exchanger 6 for reheating to the air going to the passenger compartment and transferred in the heat exchanger 9 to the engine cooling circuit 3 or it is surrendered exclusively in the heat exchanger 9 to the engine cooling circuit 3. In this case, the refrigerant circuit 2 is operated either in the refrigeration system mode or in the reheating mode. When operating in the refrigeration system mode, the heat exchanger 6 is not subjected to air. When operating in the reheat mode, the heat exchanger 6, which is also known as a heating register, performs the function of a second condenser/gas cooler, besides the heat exchanger 9.

The air taken in through a blower (not shown) is first taken across the evaporator 4, then the heating heat exchanger 13 and then the heating register 13 in the direction of flow, before it flows into the passenger compartment. The heat exchangers 4, 13, 6 are consequently arranged one after another in the indicated sequence with regard to the air being taken to the passenger compartment and are switched on and off according to need and operating mode. Alternatively, the heating register 6 can also be arranged downstream of the heating heat exchanger 13 in the direction of the air flow.

The heat exchanger 6 allows heat to be transferred directly to the ambient air from the refrigerant by configuring special openings and air baffles inside the climate control system.

Within the engine cooling circuit 3, the coolant, preferably a water/glycol mixture, is circulated between the motor 14 and the heat exchangers 15, 9. In the heat exchanger 15 configured as a coolant/air heat exchanger the heat is transferred from the coolant to the ambient air. After this, the coolant flows through the heat exchanger 9 configured as a refrigerant/coolant heat exchanger and takes up heat from the condensing refrigerant, before being conducted through the branch A to the motor 14. The heat exchanger 13 has no coolant flowing through it.

The coolant circulating in the engine cooling circuit 3 cools the combustion engine 14, which is in operation. The motor 17 configured as an electric motor is not conditioned with coolant. The branch A, configured as a bypass around the electric motor 17, is open, while the branch B, configured as a bypass around the combustion engine 14, is closed. Alternatively, the branch B can also be fashioned inside the motor 14.

The engine cooling circuit 3 has devices not shown in the figures for the circulation of the coolant. The devices can be arranged as separately formed pumps within the engine cooling circuit 3, for example. In alternative embodiments, the pumps can also be configured as part of the motors 14, 17, each motor 14, 17 forming a unit with one pump.

Figure 1B:
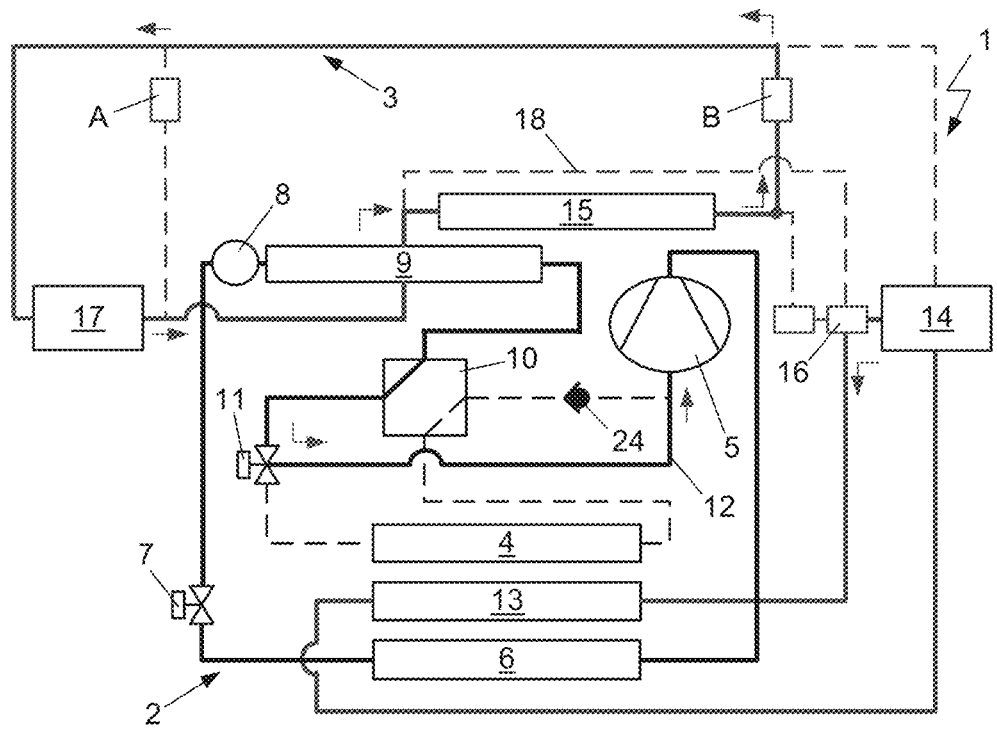
Figure 1C:
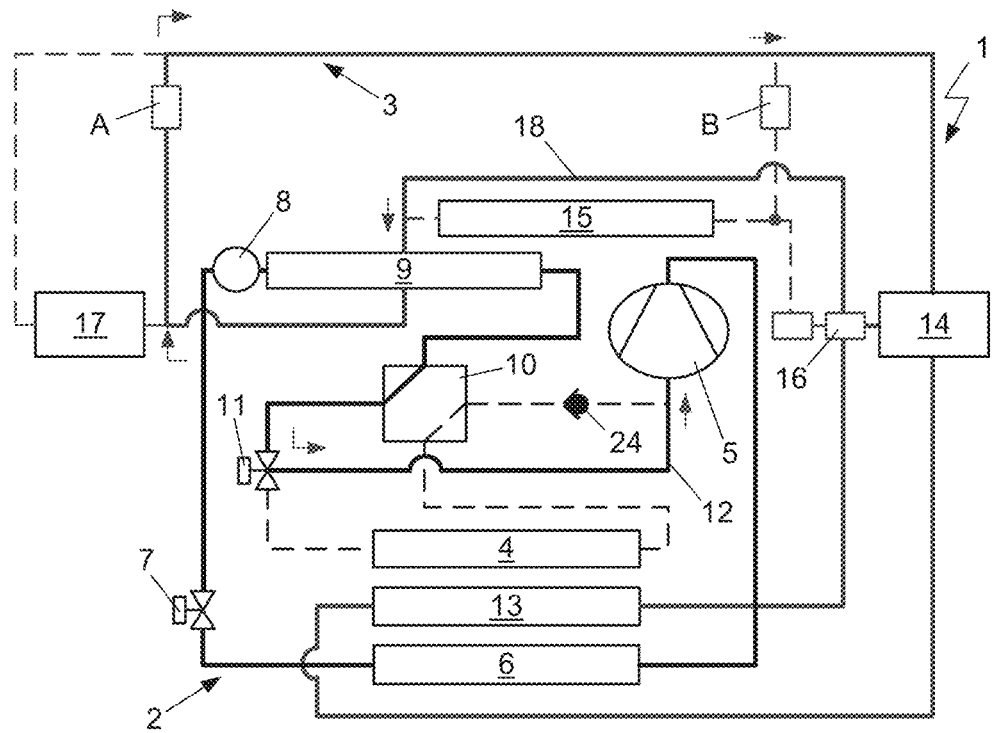

At low environmental temperatures, the passenger compartment may need to be heated, which is done by means of the device 1 operating in the heating or heat pump mode according to FIGS. 1b and 1c.

FIG. 1b shows the refrigerant circuit 2 in the heat pump mode with ambient air and FIG. 1c with coolant of the engine cooling circuit 3 as the heat source.

Unlike the operating mode of FIG. 1a, the entire heat taken up in the refrigerant circuit 2 is surrendered in the heat exchanger 6 to the air going to the passenger compartment. In the valve 7, operating as an expansion element, the refrigerant exiting from the heat exchanger 6 is expanded to a pressure level corresponding to the coolant temperature in the two-phase region in the heat exchanger 9, where the refrigerant is evaporated. During the evaporation process, the refrigerant takes up heat from the engine cooling circuit 3.

The valve 11, configured as a three-way valve, is switched so that the refrigerant is conducted past the compressor 5 by a bypass 12 at the evaporator 4 and the inner heat exchanger 10. Since the inner heat exchanger 10 only receives flow on one side, no heat is transferred. The inner heat exchanger 10 is inactive.

The check valve 24 serves to prevent a refrigerant buildup in the evaporator 4 and in the inner heat exchanger 10 when the refrigerant circuit 2 is operating in heat pump mode.

According to FIG. 1b, a portion of the coolant within the engine cooling circuit 3 is circulated between the heat exchanger 9, the heat exchanger 15 and the electric motor 17. The heat surrendered in the heat exchanger 9 to the evaporating refrigerant is taken up from the ambient air in the heat exchanger 15. The electric motor 17 is not in operation, but can be used as a heat source or heat sink.

A second part of the coolant can be circulated between the motor 14 and the heat exchanger 13 when the combustion engine 14 is in operation. The heat taken up during the cooling of the motor 14 is transferred in the heat exchanger 13 to the air going to the passenger compartment.

The individual regions of the engine cooling circuit 3 are switched on and off according to the heat demand for the heating of the passenger compartment.

According to FIG. 1c, the refrigerant circuit 2 in the heat pump mode is operated with coolant of the engine cooling circuit 3 or the motor 14 as the heat source.

The valve 16, configured as a four-way valve, is switched so that the coolant is conveyed in a bypass 18 around the heat exchanger 15 and thus no heat is taken up from the ambient air. Alternatively, the valve 16 can also be configured as a combination of several valves. The coolant is circulated between the heat exchanger 13, the heat exchanger 9 and the motor 14. The heat taken up upon cooling of the motor 14 is transferred in the heat exchanger 13 to the air going to the passenger compartment and/or in the heat exchanger 9 to the evaporating refrigerant. The refrigerant then surrenders the heat back again to the air going to the passenger compartment in the heat exchanger 6.

The heat exchangers 9, 13 or the engine cooling circuit 3 and the refrigerant circuit 2 are switched on and off in this process according to the heat demand for the heating of the passenger compartment. By switching the valve 16, for example, the coolant can be taken only through the heat exchanger 9 or only through the heat exchanger 13 or through both at the same time.

Furthermore, a heating of the air going to the passenger compartment by heat transfer in the heat exchanger 6 and in the heat exchanger 13 is possible.

Figure 1D:
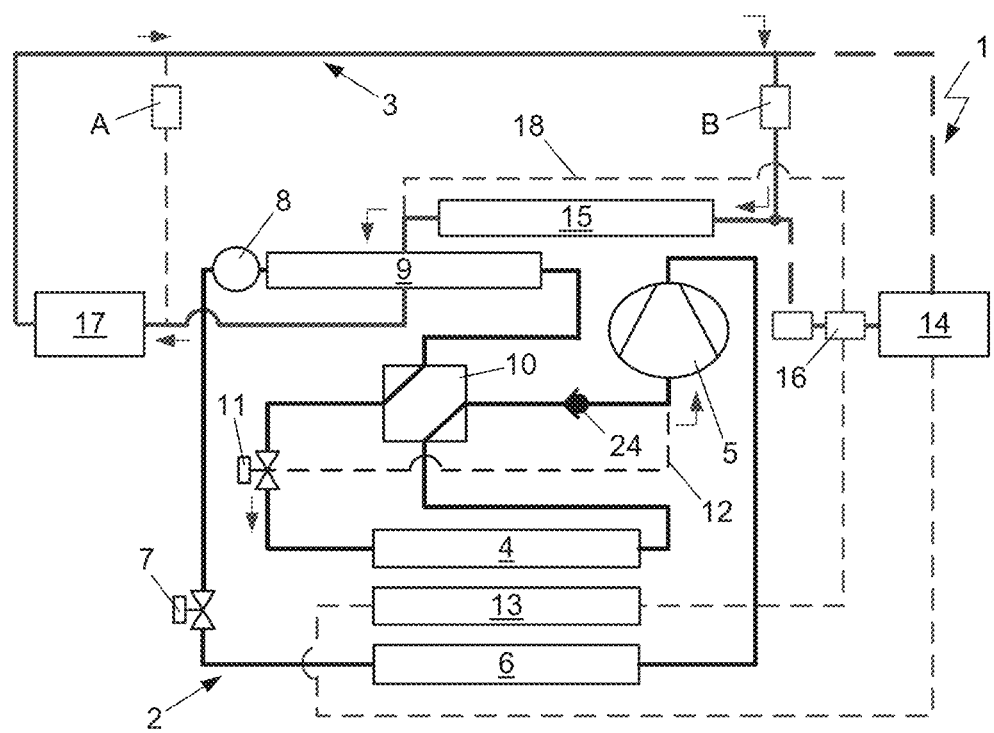

In the design according to FIG. 1d the refrigerant circuit 2 is operated in the refrigeration system mode or in the reheat mode, similar to FIG. 1a. Within the engine cooling circuit 3 the coolant is circulated between the motor 17, instead of the motor 14 of FIG. 1a, and the heat exchangers 15, 9, as the solid lines indicate. In the heat exchanger 15 the heat is transferred from the coolant to the ambient air. After this, the coolant flows through the heat exchanger 9 and takes up heat from the condensing refrigerant, before being taken to the motor 17. The heat exchanger 13 does not receive a flow of coolant.

The coolant circulating in the engine cooling circuit 3 cools the electric motor 17, which is in operation. The internal combustion engine 14 is not conditioned with coolant. The branch B, configured as a bypass around the motor 14, is opened, while the branch A, configured as a bypass around the electric motor 17, is closed.

According to an alternative operating mode of the engine cooling circuit 3, the branch B is closed as a bypass around the internal combustion engine 14, so that coolant heated upon flowing through the heat exchanger 9 and upon cooling the electric motor 17 is taken to the internal combustion engine 14, as the broken lines indicate. In this process, heat can be transferred from the coolant to the motor 14. The internal combustion engine 14 can thus be warmed up or preconditioned in the shut-off state, i.e., before being placed in operation.

In the embodiment according to FIGS. 1a to 1e, there is the possibility on the one hand to condition the motor 14, 17, which is not in the driving condition, before being placed in operation. In particular, the internal combustion engine 14 can be warmed up by surrendering heat from the coolant to the motor 14, which is shown in particular in FIG. 1d. The heat being given off to the motor 14 is transferred in the heat exchanger 9 from the refrigerant to the coolant, and is taken up in the heat exchanger 15 from the ambient air or the motor 17. On the other hand, it is possible to use the residual heat of the internal combustion engine 14, only just shut off, to warm up the electric motor 17 if the electric motor 17 was placed in operation. The residual heat is transferred from the internal combustion engine 14 to the coolant and from the coolant to the electric motor 17.

Figure 1E:
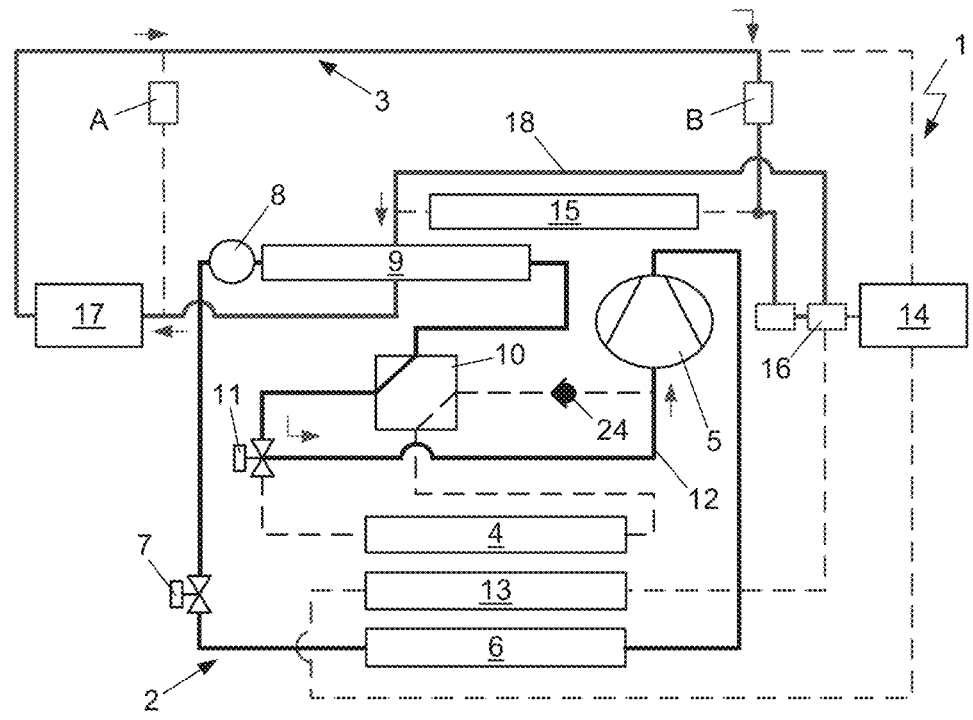

FIG. 1e shows the device 1 with the refrigerant circuit 2 in the heat pump mode with coolant or the electric motor 17 as the heat source.

The valve 16 configured as a four-way valve is switched so that the coolant is led in the bypass 18 around the heat exchanger 15 and thus no heat is taken up from the ambient air. The coolant is circulated between the heat exchanger 9 and the motor 17. The heat taken up during the cooling of the motor 17 is transferred in the heat exchanger 9 to the evaporating refrigerant. The refrigerant then surrenders the heat back, upon condensation in the heat exchanger 6, to the air going to the passenger compartment.

According to an alternative embodiment, the motors 14, 17 receive a coolant flow at all times, even at standstill or in the "out of operation" condition, so that the branches A, B are eliminated.

As shown in FIGS. 1a to 1e, the coolant, depending on the operating mode of the device 1, of the refrigerant circuit 2 in combination with the engine cooling circuit 3, can flow in both directions through the engine cooling circuit 3.

Figure 2A:
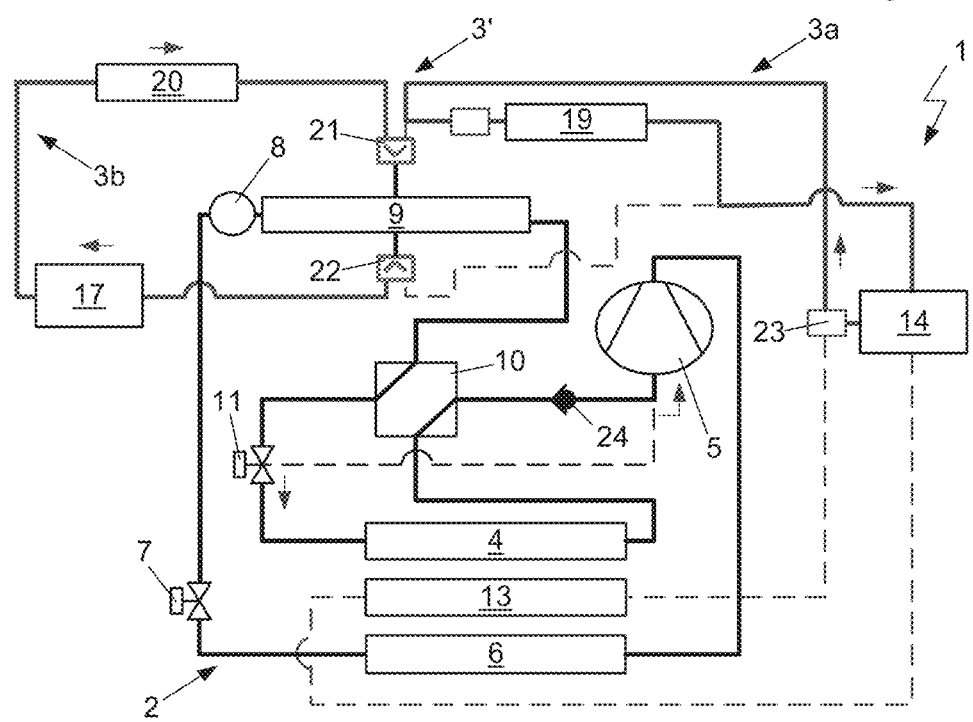
FIGS. 2a to 2c: a high-temperature cooling circuit for air conditioning a combustion engine and a low-temperature cooling circuit for air conditioning an electric motor each time in different operating modes.
Figure 2B:
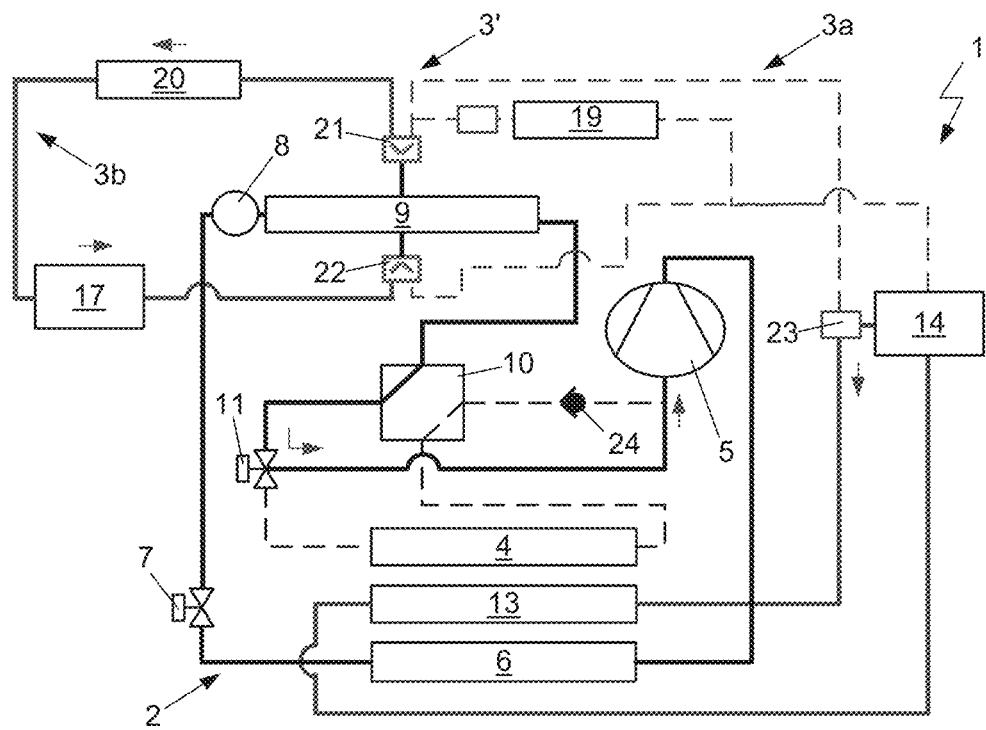
Figure 2C:
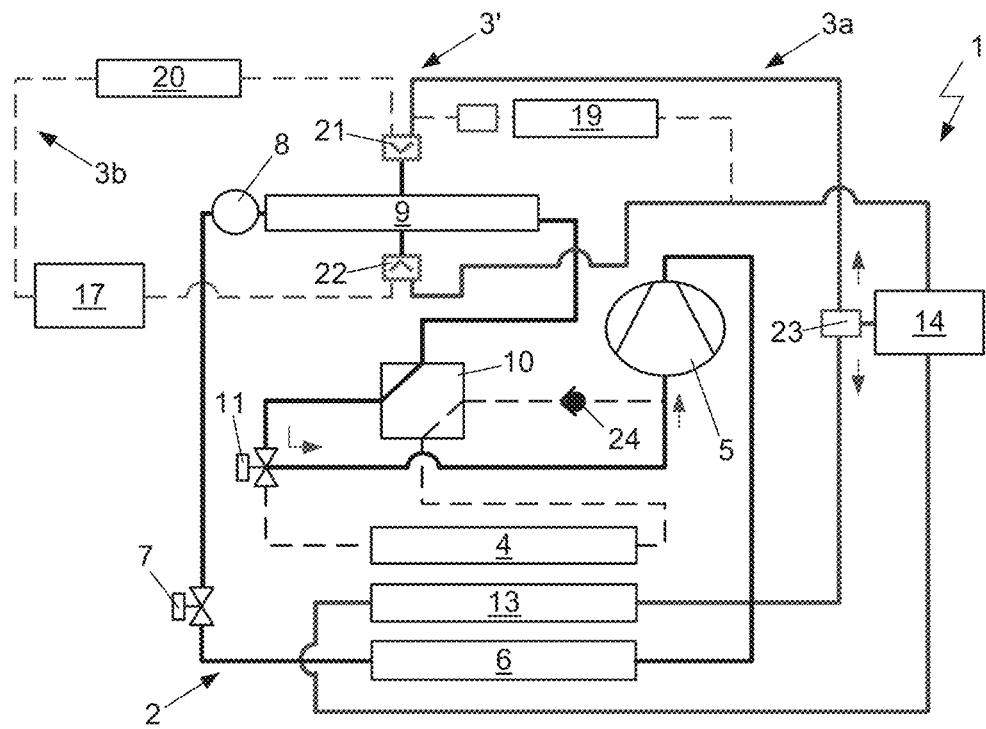

In FIGS. 2a to 2c the device 1 is shown for a motor vehicle with the refrigerant circuit 2 and a two-piece engine cooling circuit 3' in different operating modes. The engine cooling circuit 3' is divided into a high-temperature cooling circuit 3a for the conditioning of the motor 14, configured as an internal combustion engine, and a low-temperature cooling circuit 3b for conditioning the motor 17 configured as an electric motor. Unlike the embodiments per FIGS. 1a to 1e, the engine cooling circuit 3' is divided into two partial circuits. The partial circuits have the heat exchanger 9 of the refrigerant circuit 2 in common. The refrigerant circuit 2 remains unchanged.

The high-temperature cooling circuit 3a furthermore comprises the heating heat exchanger 13 for heat transfer to the air going to the passenger compartment, the heat exchanger 19 for heat transfer with the surroundings, and a valve 23 configured as a three-way valve. The low-temperature cooling circuit 3b furthermore comprises the heat exchanger 20 for heat transfer with the surroundings.

In the coolant flow direction upstream and downstream of the heat exchanger 9 the high-temperature cooling circuit 3a and low-temperature cooling circuit 3b are coupled together via change-over valves 21, 22. By switching of the change-over valves 21, 22, either coolant of the high-temperature cooling circuit 3a or coolant of the low-temperature cooling circuit 3b is conducted through the heat exchanger 9.

According to FIG. 2a, the refrigerant circuit 2 is operated in the refrigeration system mode or in the reheat mode, comparable to the operating style of the device 1 according to FIG. 1a. The heat taken away in the heat exchanger 9, operated as a condenser, is transferred to the low-temperature cooling circuit 3b. The coolant is circulated between the heat exchanger 9 and the heat exchanger 20, so that the heat taken up in the heat exchanger 20 is given off to the surroundings. The motor 17 is not in operation.

The air going to the passenger compartment is heated upon flowing through the heat exchanger 6 and/or the heat exchanger 13. Depending on the heat demand, the heat taken away from the motor 14 is transferred to the air going to the passenger compartment in the heat exchanger 13 or to the ambient air in the heat exchanger 19. For the heat transfer to the ambient air, the coolant in the high-temperature cooling circuit 3a is circulated between the motor 14 and the heat exchanger 19.

When placing the electric motor 14 in operation with the internal combustion engine 17 shut off, the air going to the passenger compartment is warmed solely via the heat exchanger 6.

The device 1 is operated in heat pump mode according to FIGS. 2b and 2c.

FIG. 2b shows the refrigerant circuit 2 in the heat pump mode with ambient air as the heat source. The heat is transferred in the heat exchanger 20 from the ambient air to the coolant and surrendered in the heat exchanger 9 to the refrigerant circuit 2. The motor 17 is out of operation.

The heat transferred from the motor 14 to the coolant circulating in the high-temperature cooling circuit 3a is given off to the air going to the passenger compartment in the heat exchanger 13.

According to an alternative operating mode, the motor 17 is in operation. The heat arising in the motor 17 is taken up by the coolant circulating in the low-temperature cooling circuit 3b and transferred to the coolant in the heat exchanger 9. Upon cooling of the coolant in the low-temperature cooling circuit 3b below the temperature of the ambient air, heat from the ambient air can also be used besides the heat given off by the electric motor 17.

Depending on the operating mode of the device 1 or the refrigerant circuit 2, the coolant flows in opposite direction through the electric motor 17. Consequently, the motor 17 can receive flow in both directions.

FIG. 2c shows the refrigerant circuit 2 when operating in the heat pump mode with the coolant of the high-temperature cooling circuit 3a or the internal combustion engine 14 as the heat source. The heat is transferred from the motor 14 to the coolant and given up in the heat exchanger 9 to the refrigerant circuit 2 and/or in the heat exchanger 13 to the air going to the passenger compartment. No coolant is circulated in the low-temperature cooling circuit 3b.

The mass flow of coolant is divided by means of a three-way valve 23 into a first partial mass flow through the heat exchanger 9 and a second partial mass flow through the heat exchanger 13. The heat given off by the motor 14 is thus transferred directly via the heat exchanger 13 and indirectly via the heat exchanger 6 to the air going to the passenger compartment and is not taken away to the surroundings.

In another embodiment, the mass flow of coolant is not divided.

The valves 7, 11 of the refrigerant circuit 2 can also be configured as fixed throttles.

The receiver 8, which is operated as a collector in the heat pump mode of the refrigerant circuit 2 at low pressure, is advantageously configured with appropriate separation devices, such as a deflector or a centrifugal separator. In the refrigeration system mode or in reheat mode, the receiver 8 is subjected to refrigerant at high pressure.

The receiver 8, which in the indicated embodiments is arranged in the refrigerant flow direction upstream from the heat exchanger 9, can also be arranged alternatively as an accumulator on the low pressure side in the refrigerant flow direction downstream from the evaporator 4.

The switching variants and operating modes shown can be used for every refrigerant that undergoes a phase transition from liquid to gas at the low pressure side. At the high pressure side, the medium gives up the heat to a heat sink by gas cooling, condensation, and undercooling. The refrigerants may be natural substances, such as R744, R717 etc., flammable substances R290, R600, R600a etc. and chemical substances such as R134a, R152a, HFO-1234yf etc. or various refrigerant mixtures.

I claim:

1. A device for heat distribution in a hybrid motor vehicle, comprising:
    an engine cooling circuit for circulating a coolant during operation of the engine cooling circuit, the coolant in fluid communication with each of an internal combustion engine and an electric motor of the engine cooling circuit, wherein the engine cooling circuit is subdivided into a high-temperature cooling circuit for conditioning of the internal combustion engine and a low-temperature cooling circuit for conditioning of the electric motor, the engine cooling circuit including a bypass branch configured to selectively cause the coolant to bypass the internal combustion engine of the high-temperature cooling circuit; and
    a refrigerant circuit for circulating a refrigerant during operation of the refrigerant circuit, the refrigerant in fluid communication with each of a compressor, a first heat exchanger, a first expansion element, a second heat exchanger, a second expansion element, and an evaporator of the refrigerant circuit, wherein the first expansion element is arranged upstream of the second heat exchanger with respect to a flow of the refrigerant through the refrigerant circuit during operation of the compressor and the second expansion element is arranged downstream of the second heat exchanger with respect to the flow of the refrigerant through the refrigerant circuit during operation of the compressor, wherein the first heat exchanger is configured to supply heat from the refrigerant to air being conditioned for a passenger compartment, and wherein the second heat exchanger is in fluid communication with the coolant of the engine cooling circuit and is positioned to transfer heat between the refrigerant and the coolant;
    wherein the device is configured to operate in either of a first mode of operation or a second mode of operation, wherein in the first mode of operation the first expansion element is configured to actuate to an open position without expansion of the refrigerant therein and the engine cooling circuit is configured to circulate the coolant through the low-temperature cooling circuit and the bypass branch to cause the coolant to bypass the internal combustion engine of the high-temperature cooling circuit, the first mode of operation enabling heat transfer from the refrigerant to the coolant within the second heat exchanger, and wherein in the second mode of operation the first expansion element is configured to actuate to a throttling position with expansion of the refrigerant therein and the engine cooling circuit is configured to circulate the coolant through at least one of the low-temperature cooling circuit or the high-temperature cooling circuit, the second mode of operation enabling heat transfer from the coolant to the refrigerant within the second heat exchanger.

2. The device according to claim 1, wherein the high-temperature cooling circuit comprises the second heat exchanger, a third heat exchanger to transfer heat from the coolant to the air going to the passenger compartment, and a fourth heat exchanger between the coolant and the ambient air.

3. The device according to claim 1, wherein the low-temperature cooling circuit comprises the second heat exchanger and a third heat exchanger to transfer heat between the coolant and the ambient air.

* * * * *